United States Patent [19]

Borst

[11] 4,247,310
[45] Jan. 27, 1981

[54] PNEUMATIC DUST EXTRACTION

[75] Inventor: Williband Borst, Uzwil, Switzerland

[73] Assignee: Gebrueder Buehler AG, Uzwil, Switzerland

[21] Appl. No.: 923,145

[22] Filed: Jul. 10, 1978

[30] Foreign Application Priority Data

Dec. 28, 1977 [CH] Switzerland .................... 008186/77

[51] Int. Cl.³ ............................................ B01D 46/04
[52] U.S. Cl. ......................................... 55/96; 55/272; 55/303; 55/304
[58] Field of Search ................... 55/96, 272, 303, 304, 55/302

[56] References Cited

U.S. PATENT DOCUMENTS

| | | | |
|---|---|---|---|
| 2,526,651 | 10/1950 | Garbo | 260/449.6 |
| 2,712,387 | 7/1955 | Young | 210/199 |
| 3,204,390 | 9/1965 | Heyl | 55/341 |
| 3,234,714 | 2/1966 | Rymer et al. | 55/294 |
| 3,377,783 | 4/1968 | Young | 55/302 |
| 3,394,532 | 7/1968 | Oetiker | 55/302 |
| 3,457,893 | 7/1969 | Lavalier | 116/137 |
| 3,521,430 | 7/1970 | Vanderlip et al. | 55/283 |
| 3,540,193 | 11/1970 | Pausch | 55/273 |
| 3,606,736 | 9/1971 | Leliaert et al. | 55/302 |
| 3,616,614 | 11/1971 | Eisenegger | 55/294 |
| 3,680,285 | 8/1972 | Wellan et al. | 55/302 |
| 3,726,066 | 4/1973 | Colley et al. | 55/302 |
| 3,735,566 | 5/1973 | Lallwala | 55/273 |
| 3,757,497 | 9/1973 | Ray | 55/302 |
| 3,841,065 | 10/1974 | Espeel | 55/284 |
| 4,032,308 | 6/1977 | Lawson | 55/302 |
| 4,033,732 | 7/1977 | Axelsson et al. | 55/96 |

FOREIGN PATENT DOCUMENTS 1228130 7/1957 Fed. Rep. of Germany .
1407922 8/1973 Fed. Rep. of Germany .
2434534 6/1974 Fed. Rep. of Germany .
1289019 2/1962 France .
1413752 8/1965 France .
812244 4/1959 United Kingdom .
914187 12/1962 United Kingdom .
974144 11/1964 United Kingdom .
1021560 3/1966 United Kingdom .

OTHER PUBLICATIONS

Air Shock Filter, Type PEF, Buhler Brothers Limited Engineering Works, May 1970.
Air Shock Filter, Type PEF, Buhler Brothers Limited Engineering Works, Aug. 1972.

Primary Examiner—Norman Yudkoff
Attorney, Agent, or Firm—Oblon, Fisher, Spivak, McClelland & Maier

[57] ABSTRACT

In pneumatic low pressure dust extraction apparatus, filter bags are cleaned by reverse flow of air. Each cleaning operation includes a first shock phase of short duration (not longer than 0.05 sec) but at high flow intensity by which accumulated layers of dust are thrown off the outside of the bag, followed by a rinsing phase of greater duration (not longer than 1 sec e.g. 0.20-0.30 sec) but at lower flow intensity during which remaining dust is blown out of the filter cloth and the cloth is allowed to lie back gradually on its support. The apparatus includes a cleaning-air tank incorporated in the filter housing for storage of compressed air in the close vicinity of apertures of the filter bags. The height of the tank exceeds its distance from the bag apertures. There is a valve for each filter bag and it has delivery means extending into the region of the bag aperture. The duration of the reverse flow for cleaning is adjustable for obtaining optimum results suited to the operating conditions. And the intervals of time between consecutive cleaning operations are adjustable for achievement of maximum economy.

14 Claims, 6 Drawing Figures

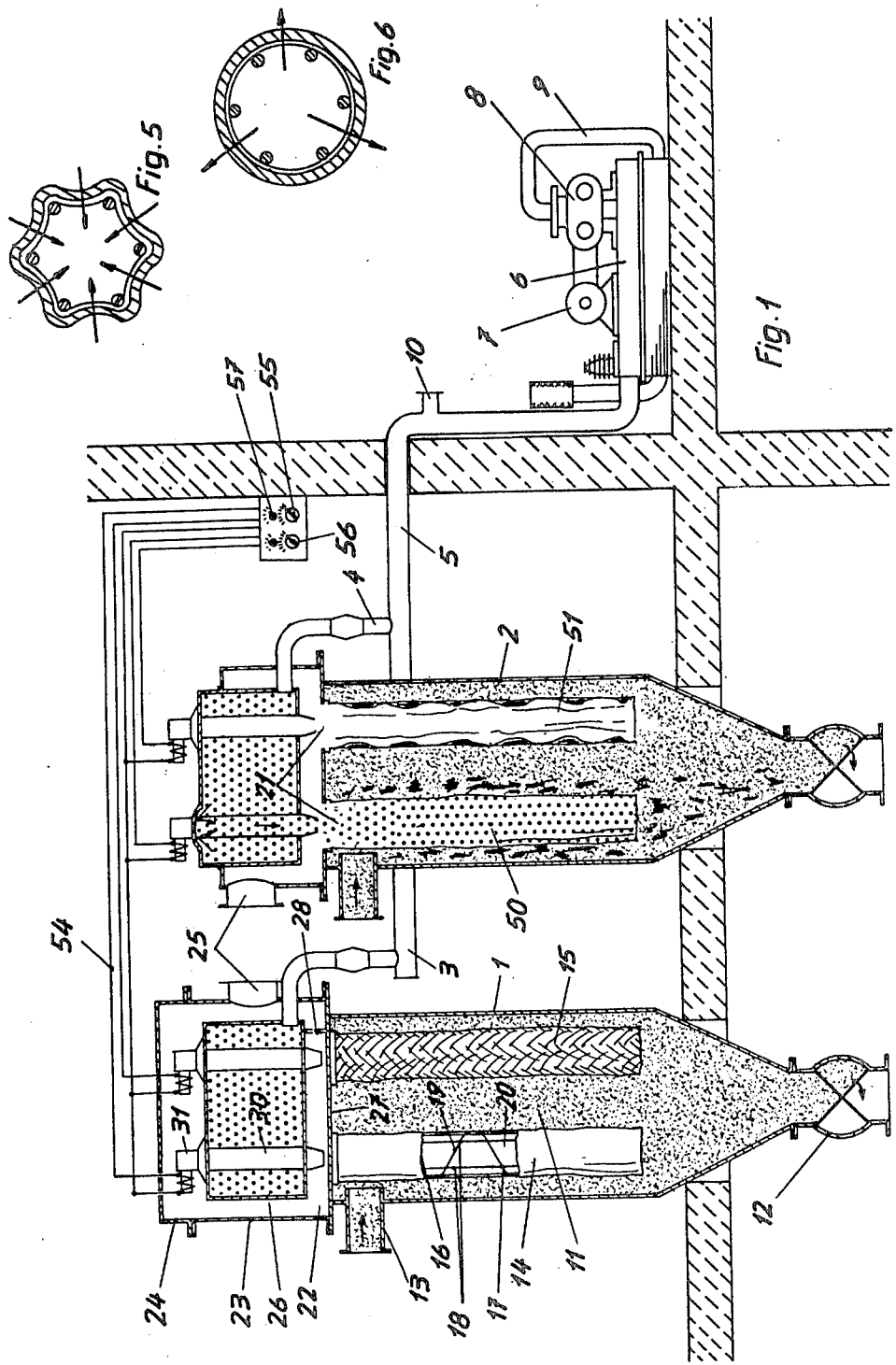

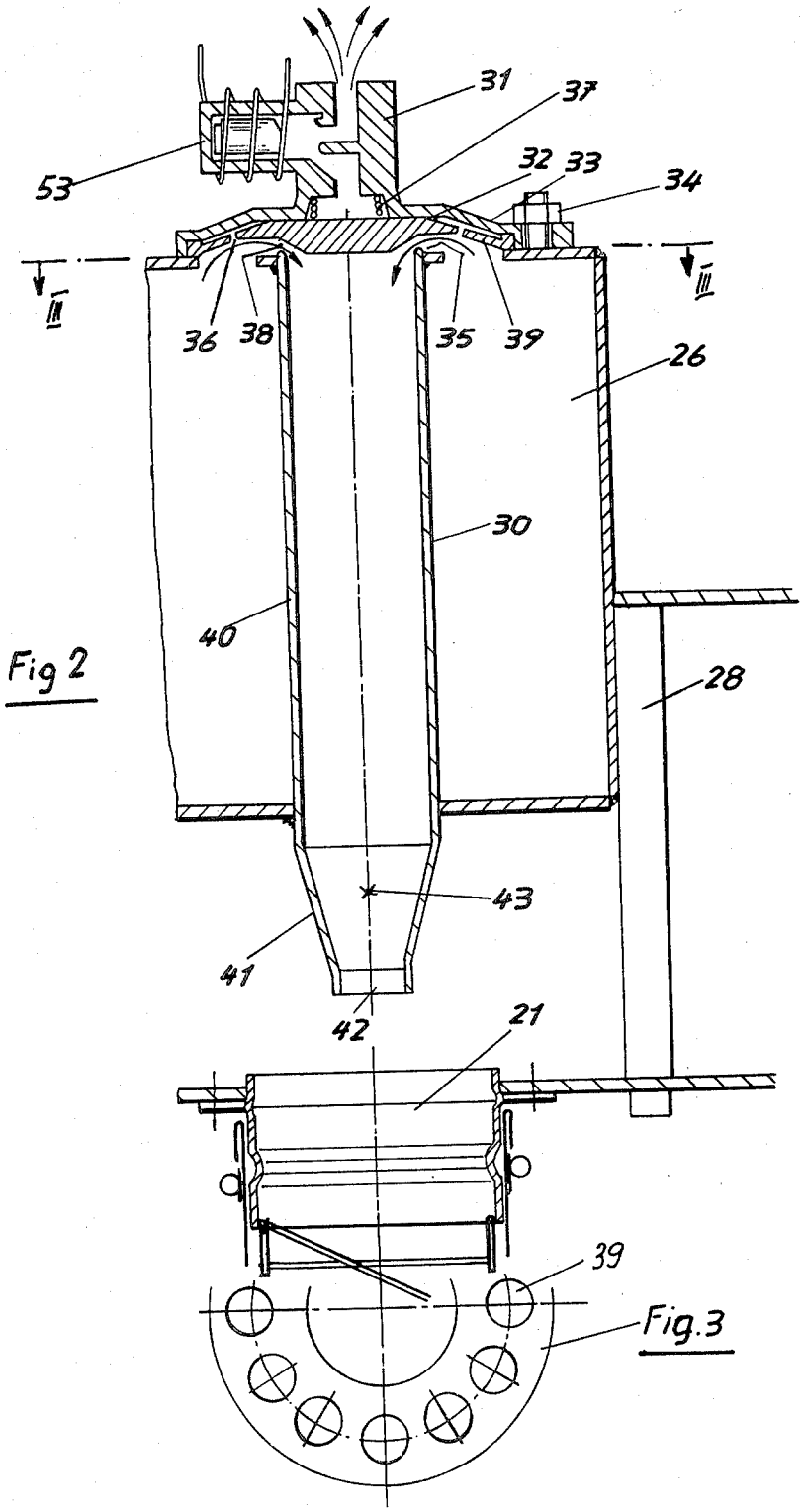

PNEUMATIC DUST EXTRACTION

FIELD OF THE INVENTION AND STATEMENT OF PRIOR ART

For the purification of air containing a very high concentration of dust, filters with reverse flow cleaning have come into widespread use in industry. This system is based on a basic idea disclosed in German Pat. No. 1228130 (Slick Industrial Co). The dust-laden air enters a dusty-air chamber at the lower region. The dust is retained by a relatively large number of individual filter bags in the dusty-air chamber and the purified air passes through free apertures into a discharge-air chamber from where it is returned into the working process or discharged into the free atmosphere. Above each free aperture of the filter bags there are mouthpieces or nozzles which are connected by way of lengths of piping and controllable valves to a high-pressure pump. The valves are opened for short periods at intervals that can be selected and inflate the filter bags with a sudden blast or shock of compressed air. The layer of dust adhering externally to a filter bag is released and falls off, so that the filter cloth is cleaned and can operate again with full effectiveness. This system is very successful.

In a further development of this idea a low pressure filter is disclosed in British Pat. No. 1 021 560 (Buhler) which has such a reverse flow cleaning arrangement. A low pressure filter operates with dry oil-free cleaning air and does not require any separate compressed air supply. Here again, filter bags situated in a dusty-air chamber are connected by free apertures with a discharge air chamber situated above the dusty-air chamber. However, in this known filter venturi nozzles are arranged above each aperture, so that the purified air flows into the discharge-air chamber only by way of the venturis. The cleaning air is kept in a cleaning-air tank permanently at a pressure below 1 atmosphere, usually at 0.3–0.5 atmosphere excess pressure, and the cleaning-air tank has the necessary capacity to supply the compressed air shocks necessary for cleaning the filter bags. The cleaning-air tank is connected by way of a conduit to an air distribution chamber to which the controllable valves are connected. The mouthpieces of the valves are each directed centrally into the venturis at a short distance above the venturis and therefore into the interior of the filter bags. In the air distribution chamber a small air reserve is present within the filter housing itself but this alone would not give any reverse cleaning effect. If the air distribution chamber has a content of for example 40 liters which is then allowed to expand from 0.5 to 0.4 atmospheres excess pressure, this gives roughly an effective volume of cleaning-air of only 4 l. But with known low pressure filters 40–80 l of effective cleaning-air is expected to be available. A similar volume cannot be accommodated in the filter housing itself.

Therefore in some constructions the air generator itself has been built into the filter head or connected directly thereto. The air required for cleaning or which is effective in the cleaning process is thus fed-in directly during the cleaning phase by the air generator, rotary piston compressor etc. In many cases the air generator or air source has been connected as near as possible to the air distribution chamber in order to ensure a suitable supply during cleaning.

The main problem with low pressure filters is that the cleaning air is compressed but relatively little and consequently a proper shock of compressed air cannot be produced. But the pressure surge of cleaning air must reverse the flow of purified air in the aperture, even with a low pressure of 0.5 atmosphere excess pressure or less, and must carry out an effective back or reverse cleaning operation. This object was achieved with the aforesaid constructional form of Buhler by producing instead of a shock of cleaning air, a flow of cleaning air which by way of venturis carries along from the discharge-air chamber a considerable quantity of already purified air, thus approximately doubling the quantity of air effectively available for cleaning, and with this doubled quantity of air again carries out an intensive reverse flow action and thus an extremely good cleaning effect. The aforesaid cleaning method, wherein each filter bag is acted upon individually at adjustable intervals of time, has now been carried out successfully by Buhler (the proprietors of the prior patent and proprietors of the present invention) in actual practice for approximately fifteen years, using very high filter loads as regards both air quantity and dust content, for example for separation and recovery of flour dust in flour mills.

A large number of similar solutions are also known wherein the entrainment of secondary air or already purified air has been used partly or not at all. In one such low pressure filter, the mouthpiece of the valve was taken directly to the aperture of the filter bags, so that only a small annular gap was left free for the air purified by the filter. But this solution was found to give a low-quality cleaning effect. This substantially reduces the filter load, so that the entire purification plant has to be made larger. Buhler themselves in a further constructional form tried to improve the cleaning effect by connecting the normally free aperture of the filter bag by a mechanically moved tubular element directly to the mouthpiece of the valve. Although in that constructional form, flow losses were kept small, with the device used it was not possible even after years of effort to obtain a uniform cleaning effect. With low filter loads, this filter apparatus does in fact operate in an excellent manner, but under high load great differences were observed in the cleaning of individual bags. With the knowledge available previously it was not possible to explain the problems satisfactorily, since in fact in the case of mechanical operation the most sudden rise in pressure was measured when the reverse cleaning action began. However, the pressure then collapsed at once to a very low value.

And German laid open specification 24 34 354 (Margraf) discloses the feature of a cleaning air pulse followed by a gradual return of the filter elements against their supports. This is achieved by controlled return suction to retard the escape of the cleaning air from the open end of the bag after the cleaning air pulse has ceased. The construction disclosed is mechanically complex and slow acting.

The invention has as its object to provide improvements in pneumatic dust extraction, directed to the problems discussed above. Surprisingly it has now been found that with the present invention it is possible to obtain an actual improvement in the reverse air flow cleaning effect and also a substantial simplification of apparatus employing reverse flow cleaning of bag filters.

SUMMARY OF THE INVENTION

According to one of its aspects the invention provides a method for cleaning of bag like fabric filter elements in a pneumatic dust extraction apparatus by reverse flow of gaseous medium (herein termed "gas") through respective free apertures into each said filter element in a direction the reverse of and upstream with respect to the direction of filtered gas; said method including a shock phase immediately followed by a rinsing phase; said shock phase including throwing off a layer of accumulated dust from said filter element by the sudden application of reverse gas flow of high intensity for a short duration whereby the fabric of said filter element is abruptly jerked from a filtering position to a modified position upstream with respect to said filtering position; said rinsing phase including removing at least part of remaining dust particles from said filter element by the continued application of reverse gas flow of reduced but sustained flow intensity and of longer duration, and gently returning said fabric of said filter element from said modified position to said filtering position; said shock phase not exceeding 0.05 second and said rinsing phase being not more than 1 sec in duration.

Only with this new method has it ben recognised that the cleaning operation has hitherto only been started and has not been fully completed. It is a commonly held view, even stated in recent publications, that in relation to the cleaning effect the duration of the cleaning pressure phase is not of critical influence. According to the present invention it has been recognised that the first shock should effectively throw off the layer of dust, and then, with a reduced intensity in the action of the cleaning air, during the rinsing phase, the dust particles in the filter cloth should be loosened and blown out of the cloth by the air flow and that the filter cloth should relax and lie back against the supporting cradle more slowly and gently, preferably gradually. The penetration of dust into the interior of the filter bag after each cleaning cycle which has hitherto been accepted almost as a law of nature and which in special cases (such as fine colour powder) can be detected with the naked eye as a cloud of dust in the clean air, was found to be wholly absent in trials, at any rate to the extent of not being detectable with the usual apparatus. We prefer to limit the rinsing phase to 0.2 sec to 0.3 sec.

The new method can be translated into actual practice in various ways. The solution which suggests itself consists in controlling the cleaning air valve as regards time and air quantity from a source of high pressure in accordance with the new method or for example using a valve with two opening positions or two different valves or a valve with a special constructional arrangement of the closure members. According to tests carried out so far best results are obtained if the rinsing phase lasts 3-20 times longer, preferably 3-7.5 times longer than the shock phase, and the mean pressure in the filter bag during the rinsing phase is about 2-6 times lower than the corresponding peak pressure during the shock phase.

An important point is considered to be that during the entire reverse flow cleaning operation a positive pressure is produced in the filter bag, and there is a gradual change-over to the re-commencing filtering operation. In practice almost without exception the air being filtered will be drawn through the filter cloth, in other words a negative pressure prevails in the filter bag namely pressure lower than that in the surrounding dust chamber. In order to obtain specific conditions for the reverse flow cleaning operation, more particularly the changeover back to the filtering operation, and also in order to achieve minimum consumption of energy and cleaning with the minimum effective quantity of cleaning air, the duration of the reverse flow of cleaning air must be adjustable, preferably infinitely adjustable. Depending on the way in which the method is realised in apparatus form, the intensity of the reverse flow cleaning air may be adjustable simultaneously or independently for the shock phase and for the rinsing phase. Best results have been obtained in trials when the effective quantity of compressed cleaning air corresponded approximately to the content of a filter bag, that quantity of cleaning air being kept ready in the close vicinity of the free aperture of the filter bag with a pressure of 3000 mm-8000 mm water column, preferably 4000 mm-6000 mm water column, and discharged by way of a large-area valve with a driving nozzle directly against the interior of the filter bag, with the cleaning time adjusted to such a duration that the large-area valve closes again at a pressure higher than 2000 mm-3000 mm water column. The method can therefore be used with particular advantage for the cleaning of a low pressure filter, wherein an effective cleaning air quantity corresponding approximately to the capacity of a filter bag is discharged with an average positive pressure of at least 3000 mm but at the most 8000 mm water column directly from an air tank by way of a large-area valve into a nozzle directed freely into the filter bag. In most cases it has been found advantageous to bring the air pressure in the cleaning air tank before a cleaning operation to 4000 mm-6000 mm water column and to allow it to fall to 2000 mm-3000 mm water column in the cleaning air tank during a cleaning operation.

FIG. 4 shows the measured pressure loss at various points in a filter bag somewhat over 2 m in length and at its free aperture, the air pressure in the cleaning air tank at the beginning of a cleaning operation amounting to about 5000 mm water column and to rather less than 3500 mm water column at the end of the cleaning operation. The curves were recorded by means of piezoelectriv crystals and cathode ray oscillographs, and show in the vertical direction the pressure pattern, and horizontally the time, beginning at the right from 0. In order to obtain a slightly clearer picture the curves have been spaced apart vertically.

The pressure curve A was measured right at the top at the free aperture of the filter bag in its mounting sleeve rather than at its filtering portions, and the curve E at the lowest point above the closed lower end of the filter bag. The curve E and also the nearest curve D are therefore also affected by marginal influences (throwback of the pressure wave etc.) but already show a relatively steep first increase in pressure at the beginning (0.05 seconds) and after the peak clearly show the rinsing which lasts for about 3/10 sec. with lower but sustained intensity or pressure. The curves B and C, which are representative of about ⅔ of the bag length from the centre, show the new method very clearly. In both cases the first increase in pressure lasts for about 1/100 sec. and is thus extremely sudden. After a further 3/100 sec. the first cleaning phase namely the shock phase is concluded. It should also be noted that the pressure measurements were carried out with a clean filter bag. If there is a layer of dust on the filter bag the pressure increase in the first cleaning phase would be substantially more distinctive. Curves B and C also show a gentle change-over from the first shock phase to the second cleaning phase namely the rinsing phase. The change-over from the first phase to the second phase also determines whether the great advantages of the new method can be fully utilised. For if there were even a pause of very short duration between the first phase and the second phase within the filter bag there would be a risk that the filter fabric would strike back against the supporting cage and fine dust would be forced through towards the inside.

The rinsing phase is characterised by a sustained relatively steady but deep pressure pattern. During the rinsing phase the mean pressure, depending on which curve is considered, is about 6 to 2 times smaller than the corresponding peak pressure in the first cleaning phase. The time ratio between the first throwing-off phase and the reverse flow rinsing phase is between 1:3 and 1:7.5. So far optimum values have been ascertained for very few products. It is to be expected that with some products the rinsing phase will have to be up to more than 20 times longer than the first phase. The other extreme value will probably be where such a slow reduction in pressure takes place that the filter cloth does not move back quickly but goes back correspondingly slowly against the supporting cage.

The curve at the measurement point A is very interesting, this being situated at the upper free aperture of the filter bag. If the pressure pattern is followed again from the right towards the left, a first pressure peak can be observed which is steeper and higher than all the pressure values inside the filter bag. This is in a sense the first impact of the high intensity flow of compressed air on the clean air flowing in the opposite direction from the filter bag. The time for the first pressure increase is not even 5/1000 sec. Of course with such a short action time no damage can be caused to the filter cloth. In fact it is only to be expected that at the first impact on one another of the two air flows flowing in opposite directions there would be a positive pressure peak. After less than 1/100 of a second the positive pressure changes round to a negative pressure at the free aperture. But the curve A shows, if one disregards superimposed fine oscillations, a relatively rapid increase of the negative pressure which then is gradually cancelled out towards the end of the reverse flow cleaning operation. It is possible to conclude from this that from the beginning to the end of the entire reverse flow cleaning operation a positive air flow occurs from the interior of the filter bag towards the exterior, and as already mentioned several times there is a gentle change-over from the reverse flow cleaning operation to the normal operation of dust removal.

From what has been said hereinbefore it is therefore possible to derive a number of new precepts, A sudden high intensity flow and pressure increase for initiating the reverse flow cleaning.

A short duration pressure peak (the throwing-off of the layer of dust from the external surface of the cloth requires only a very short time, and to prolong such a time would not bring any further advantage and would only result in a greater loss of air).

A change-over to the second after-scavenging phase, and here it is particularly important that a positive air flow, from the interior of the filter in an outward direction is maintained.

A gradual reduction in pressure in the filter bag so that the change-over of air flow from the reverse flow cleaning operation to the normal dust removal operation is carried out gently, and the filter cloth itself lays itself approximately on the supporting cage and takes up the inwardly curved shape.

The entire reverse flow cleaning operation is very short and usually lasts for less than one second, but preferably less than half a second.

Thus, in the method provided by the invention after the first pressure peak has been reached a rinsing phase is initiated which is controlled as required both as to time and hence in a sense after rinsing intensity (e.g. mean air flow intensity), and which carries out a following after rinsing which in a way can be regarded as independent of the preceding pressure pulse and of a chosen reduced and then substantially sustained rinsing intensity.

According to another of its aspects the invention provides a low pressure dust extraction apparatus comprising a dusty-air chamber, a discharge-air chamber, a cleaning-air tank for storage of compressed gaseous medium for cleaning, a plurality of bag-like fabric filter elements each having an open end, and a corresponding plurality of free apertures at said open ends of said filter elements for the passage of filtered gaseous medium (herein termed "gas") from said dusty-air chamber by way of said filter elements to said discharge-air chamber, means for causing flow of gas such that filtered gas flows out of said discharge-air chamber and dust-laden gas flows into said dusty-air chamber, a corresponding plurality of controllable cleaning-gas valves, said valves having delivery means directed for flow of cleaning-gas by way of said free apertures into said filter elements in a direction the reverse of that of said filtered gas and extending into said discharge-air chamber to the region of said free apertures, said discharge-air chamber being situate directly above said dusty-air chamber, and said cleaning-air tank being situate above said dusty-air chamber in the close vicinity thereof but vertically spaced thereabove, the vertical dimension of said cleaning-air tank being greater than the vertical distance between said cleaning air tank and said free apertures, control means for governing the duration of opening of said valves, and said valves being connected to said cleaning-air tank whereby the required quantity of cleaning-gas at a predetermined pressure can flow directly from said tank by way of said delivery means into said filter elements with varying outflow intensity including a shock phase of high intensity but of short duration immediately followed by a rinsing phase of reduced but sustained intensity and of longer duration.

In actual practice there are two predominating opinions according to one of which a strong short-duration blast of compressed air should be directed into the filter bag. According to the other view, a longer-duration flow of reverse flow cleaning air lasting at least several seconds but with a correspondingly deep intensity should be used in order not to damage the filter cloth and yet to clean it in a satisfactory manner. But it has been recognised now that the cleaning operation hitherto has always been influenced and controlled only in a partial aspect. Now, one apparatus, when suitably operated, enables the reverse flow cleaning to be intensively initiated and then effectively completed, allowing a substantially higher filter throughput and also giving a better cleaning effect.

In a relatively smaller filter apparatus with for example 24 filter bags, in a single pass each individual bag after the other was cleaned in trials with the reverse flow cleaning method. This cycle was repeated during the entire period of operation. It was found to be advantageous if the largest possible interval of time is allowed between consecutive reverse flow cleaning operations, so that a relatively thick layer of dust from several millimeters up to 1 cm can accumulate externally on the filter bags. As is known, the layer of dust itself is a better filter material, or at least a filter material more specific to the product, than any filter cloth, since the pores in the layer of dust are smaller than the dust particles which are to be filtered out. The dust layer is slightly consolidated by the flow of air and forms a coherent coating of dust about the entire bag. The filter cloth of each bag is fitted over a wire cage so that the filter cloth retains a tubular shape even with a strong flow of air, i.e. a corresponding air pressure from the outside towards the inside. The filter cloth curves inwardly at the free openings of the wire cage and the layer of dust adapts itself to this shape. Then by suddenly opening a large-area diaphragm valve, a first cleaning air shock of high intensity is produced which is directed towards the interior of the filter bag. With the first shock, the column of air in the filter bag is compressed, and as compared to the pressure outside the filter cloth a positive pressure is produced within it and with the energy of the shock wave the filter cloth with the layer of dust is inflated and the layer of dust thrown off. Now in the case of most hitherto known filters, the filter cloth in the known constructional arrangements moves outwards and inwards again at approximately the same speeds. Even with small pressure differences, forces of 50 to several hundred kg actually occur which press or throw the filter cloth inwardly again. Therefore, in the case of those known filters, the rearward movement can also be regarded as very sudden, with the result that a relatively large proportion of the dust particles in suspension round about the bag are forced inwardly through the fully open pores of the filter cloth as well as dust particles which are trapped in the filter cloth itself.

But it is incorrect to deduce on the basis of these facts that the cleaning blast should simply last for a longer time, since this would not only require many times more compressed air, compared for example to the internal filter bag volume, but in addition the filter cloth would be subjected to load with considerable force which would result in premature tearing of the fabric.

Optimum values for air consumption, filter cloth stressing and also for the filtering operation itself (with much lessened interruption) are achieved if after a first blast a rinsing phase of reduced but sustained intensity is carried out, when an after-pressure is effective which is made such that the cloth is cleaned further and also resumes its inwardly curved shape slowly. Here also, the comparison can be made with a carpet which is to be beaten only on one side, namely in the direction away from the house.

In a low pressure filter, satisfactory after-rinsing was obtained when a quantity of cleaning air corresponding approximately to the volume of a filter bag was delivered with an average positive pressure of at least 3000 mm but at the most 8000 mm water column directly at the cleaning air tank through a large-area valve into the nozzle which is directed freely into the filter bag. With a filter bag capacity of 20 l, very good results have been obtained with 15 l to 30 l of cleaning air. Best values were obtained when the pressure in the air tank before cleaning amounted to 4000 mm–6000 mm water column and during cleaning did not fall below 2000 mm–3000 mm water column, since in this way powerful after-rinsing effect is reliably obtained in the case of a low pressure filter. If the initial pressure is too high, too much air would be used. But if with a pressure that is too high, the valve is set to open for a very short duration, the intensity for the after-rinsing would have to be controlled separately, for example by special construction of the valve with two opening stages. Such additions are not necessary in low pressure filters because of the particularly advantageous constructional arrangement.

An important measure in the new low pressure filter also is considered to be the fact that the effective quantity of cleaning air is kept ready directly at the valve. The cleaning air is discharged with almost full energy directly into a driving nozzle. The driving nozzle extends into the region of the free aperture of the filter bag being spaced a short distance above it, and is directed into the interior of the bag. The pressure energy is converted at the last moment in the bag into the first shock cleaning phase and the subsequent rinsing phase.

BRIEF DESCRIPTION OF THE DRAWINGS

The invention will now be described with reference to an embodiment thereof and some preferred constructional ideas will be described, with reference to the accompanying drawings in which:

FIG. 1 shows a complete filter installation with two low pressure filter apparatuses;

FIG. 2 shows a fragmentary view of the cleaning-air tank with valve and nozzle;

FIG. 3 is a section as seen along the line III—III of FIG. 2, showing details of the transition between the cleaning-air tank and the nozzle;

FIG. 5 shows the inwardly curved filter bag in sectional view when separating out dust; and FIG. 6 shows the same bag during reverse flow cleaning.

DESCRIPTION OF PREFERRED EMBODIMENTS

Figure 4:
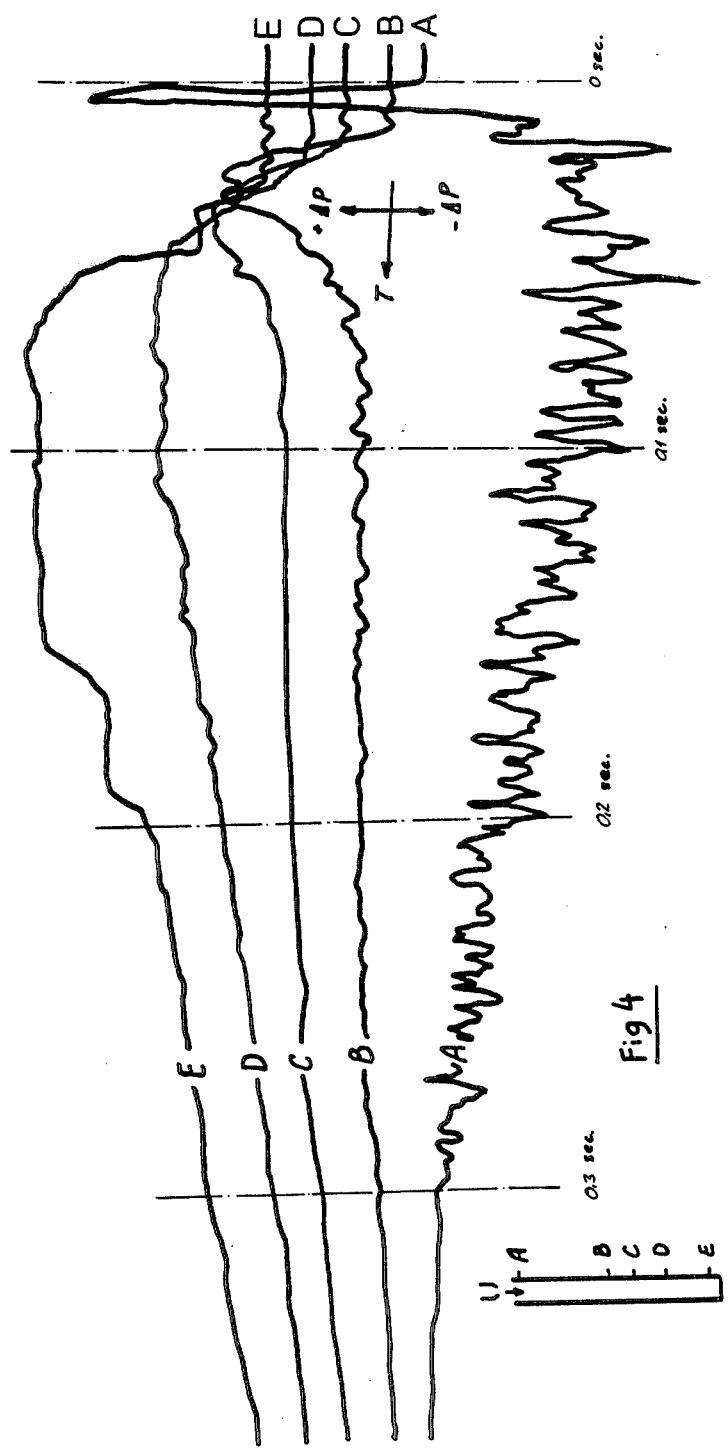
FIG. 4 shows the pressure pattern at several points relative to the filter bag during a reverse flow cleaning operation.

Reference will now be made to FIGS. 1, 2 and 3.

FIG. 1 shows the use of two low pressure filters or filter housings. The filter 1 on the left and the filter 2 on the right are connected by conduits 3 and 4 and by the conduit 5 to a common compressor unit 6 for the cleaning air. The compressor unit 6 comprises a driving motor 7, a rotary piston air-pump 8 and a sound-suppressor device 9 acting at the suction and delivery sides. Since compressors usually produce a disturbing noise, there has been a tendency in recent years to setting up several compressor units in a separate sound-insulated chamber. This applies particularly in flour mills, since these mostly include a number of fans for pneumatic conveyance. As indicated with a branch connection 10, the air from the compressor can supply other air-consuming apparatus.

The filter 1 includes a large dusty-air chamber 11 closed off to the exterior by an air lock 12. The filter 1 also has an inlet union 13 for the dust-laden air to be cleaned, and filter elements in the form of filter bags 14 and 15 secured to an upper closure plate 27. In actual practice a mere two filter bags will be used only in special cases, for example for silo top filter apparatus. In industry generally, filter apparatus with about 20–100 filter bags will be more commonly used. For the filter bag 14, a tubular filter cloth 16 is fitted over a supporting cage 17 which itself is constructed from vertical bars 18 and helical coils 19 and thus forms a large number of open spaces 20. The supporting cage 17 together with the filter cloth 16, or the filter cloth alone, can be released from the closure plate 27 of the dusty-air chamber 11. Each filter bag 14, 15, respectively has a free aperture 21 open to the top through which the air purified by the filter cloth can flow out freely, as shown for the filter 2. All the air flows through the free aperture 21 into a discharge-air chamber 22 formed by a lower housing 23 and a cover 24 (filter 1) and by way of a suction pipe 25 to a suction fan or a central suction device, from where it can be conducted into the free atmosphere or back into the working process. Alternatively the dust-laden air could be led to inlet union 13 under pressure. A cleaning-air tank 26 is incorporated in the filter housing and arranged above the dusty-air chamber 11 spaced a short distance from it so that the discharge air can flow through the free apertures 21 unhindered into the discharge-air chamber 22. As shown clearly by FIGS. 1 and 2, the vertical height of the tank 26 is greater than its distance above the dusty-air chamber 11, namely about two to four times greater. In the construction of the filter 1 the cleaning-air tank 26 is shown completely integrated in the discharge-air chamber 22 and supported by intermediate elements 28 on the closure plate 27. In the modified construction of the filter 2 however, the cleaning-air tank 26 is shown as freely exposed above. The cleaning-air tank 26 in FIG. 2 is shown on a larger scale with a nozzle 30, and a valve 31 above the free aperture 21. The cleaning-air tank 26 is constructed with a flat surface above and below, which is possible since the nozzles 30 are taken through the cleaning-air tank 26 and connected above and below securely and in sealing-tight manner with the two tank surfaces in question, thereby imparting rigidity to the construction. The more filter bags a filter comprises, the larger the surface area of the cleaning-air tank and the larger the number of nozzles providing support for the two tank surfaces.

The valve 31 is of like construction as that shown in British Pat. No. 1 021 560 (Buhler). This is a so-called large-area valve which is adapted to the special requirements for reverse flow cleaning in suction filters. A large-area diaphragm 32 is pressed in air-tight manner on to the cleaning-air tank 26 by a valve housing 33 by screwed connections 34. The special shape of the diaphragm 32 and an appropriate intermediate space between the sealing edge 35, the nozzle 30 and the valve housing 33 allow the diaphragm 32 to be moved only from and towards the nozzle in the illustrated construction, and to go correspondingly into the open or closed position. The diaphragm 32 has a plurality of very small holes 36 so that the air pressure present in the cleaning-air tank 26 can also act on the upper surface of the diaphragm 32. In the closed position of the diaphragm 32, there is no pressure in the nozzle 30 or even a negative pressure in accordance with the pressure in the discharge-air chamber 22. As a result compressed air acts on the diaphragm from above on a larger surface area than from below. The diaphragm 32 is also pressed down by a weak spring 37 so that it is closed in normal operation, in fact by relatively large forces.

The space above the diaphragm 32 is under the control of an electromagnetically operated valve 31. When the electromagnetic valve 31 is opened the compressed air above the diaphragm 32 is discharged over an area that is relatively large compared to that of the holes 36, the pressure falls suddenly to zero, with the result that the pressure forces in the cleaning-air tank still acting from below on the corresponding free annular surface bring about a sudden release of the large throughflow cross-section 38.

The compressed cleaning-air is driven by the full force of the tank pressure through large apertures 39 in the cover of the cleaning-air tank 26 and the throughflow cross-section 38 into the nozzle 30. The nozzle itself has a relatively long cylindrical tubular element 40 and at its lower end is constructed as a driving nozzle 41 with a driving aperture 42. The narrowing shape of the nozzle 41 has the result that the compressed air rushing into the nozzle 30 from the cleaning air tank 26 over large cross-sections is compressed again in the driving nozzle in the region 43 almost to the full container pressure. The cross-sections 39, 38 and 42 are successively smaller in the direction of flow.

Best results were obtained with the driving nozzle 41 extending into the region of the free aperture 21 and spaced a short distance above it, so that the cross-section of the free aperture 21 for the flow of the purified air from below in an upward direction through the region remains substantially constant. An interesting detail is the constructional payout of the parts determining the air flow. For example the rigid connection of the lower and upper floors of the tank by the nozzle 30, and the construction of the throughflow cross-section 39 in the form of a relatively large number of individual holes arranged in a circle was regarded initially as unsuitable from the air technology point of view. But a test carried out nevertheless showed, on the contrary, that in this way an effective optimum solution had been found as regards constructional outlay, from the flow technique point of view, and also with regard to building up a maximum pressure at the region 43, thus achieving the best possible effectiveness for reverse flow cleaning in the filter bag.

The relative proportions, notably the relative vertical dimension of the tank 26, and the disposition of the nozzle 41, have the result that an adequate supply of cleaning air is maintained in the close vicinity of the free aperture 21, sufficient to provide a volume of compressed air for cleaning equal to about the volume of a filter element.

In FIG. 1 the filter bag 14 is shown as a new bag not yet put into service. The bag 15 in filter 1 and in FIG. 5 is drawn with an exaggeratedly thick layer of dust as after filtering dust-laden air for a relatively long time.

FIG. 6 is intended to show the shock cleaning phase at its height when the dust-charged bag is inflated, and the layer of dust begins to be thrown off. The bag 50 in the filter 2 is intended to show symbolically the condition during the reverse flow cleaning operation, roughly at the transition from the shock phase to the rinsing phase. The main quantity of dust has been thrown off from the filter cloth. The after-rinsing also ensures that the dust floating round the filter bag is not at once sucked back on to the bag, but is given enough time to move away and fall downwards. The cleaning operation considered as a whole could therefore also be characterised by the fact that a period of rest is imposed on the conditions prevailing after the shock scavenging. At the filter bag 51 the reverse flow cleaning has been completely terminated, and dust separation is recommencing, but only once the bag has again taken up its inwardly curved shape.

In FIG. 1 and FIG. 2 the valve 31 is shown as an electromagnetic valve as indicated by the solenoid assembly 53 which is connected by way of electrical control lines 54 to a control unit 55. The control unit 55 has a time switch 56 with which the time intervals for consecutive cleaning operations can be selected. Suitable electrical elements ensure by way of the control lines that each individual reverse flow cleaning operation is carried out after the preselected interval, and with the illustrated arrangement for small filters, the filter bags are each cleaned by reverse flow one after the other. In the case of larger filters with for example thirty and more bags, two or more bags can be cleaned simultaneously. Whether one bag alone or several bags are cleaned at the same time also depends on the characteristics of the suction system considered as a whole. The control unit 55 is shown as twinned, so that the filters 1 and 2 can be adjusted independently.

The control unit provides for a further adjustment, namely the cleaning time length setting 57. The constructional features described in detail earlier in this text, together with the provision for setting of the intervals between consecutive cleaning operations and setting of the duration of the reverse flow, allow a very large number of specific problems of dust-laden air purification to be solved in a hitherto unknown optimum manner with very simple means.

Probably, control of the valves can be achieved mechanically, but very likely with considerable constructional outlay. On the other hand, a fluid control system has been found just as suitable functionally as an electrical control system.

Of course the invention could be further improved as regards matters of detail, such as pressure monitoring of the dust-laden air and cleaning air etc.

Moreover other values have been investigated for the indicated values of cleaning air pressure and cleaning air quantity, since in fact the intensity of the reverse flow cleaning can be influenced both with the pressure and with the air quantity, i.e. it can be controlled by them. The indicated values are optimum values, at least in the case of the dust problems investigated.

I claim:

1. Method for cleaning of bag fabric filter elements in a pneumatic dust extraction apparatus by reverse flow of gaseous medium (herein termed "gas") through respective free apertures into each said filter element in a direction the reverse of and upstream with respect to the direction of filtered gas; said method including a shock phase immediately followed by a rinsing phase; said shock phase including throwing off a layer of accumulated dust from said filter element by the sudden application of reverse gas flow of high intensity for a short duration whereby the fabric of said filter element is abruptly jerked from a filtering position to a modified position upstream with respect to said filtering position; said rinsing phase including removing at least part of remaining dust particles from said filter element by the continued application of reverse gas flow of reduced but sustained and controlled flow intensity and of longer duration permitting the bag to slowly collapse over its supporting cage, and gently returning said fabric of said filter element from said modified position to said filtering position; said shock phase not exceeding 0.05 second and said rinsing phase being not more than 1 second in duration; cleaning of respective bag elements being alternative in the several elements so as to permit the continued filtering operation in the remaining elements.

2. Method as claimed in claim 1 wherein the duration of said rinsing phase is between 3 times and 20 times the duration of said shock phase.

3. Method as claimed in claim 2 wherein the mean pressure in said filter element during said rinsing phase is between ½ and 1/6th of the corresponding peak pressure during said shock phase.

4. Method as claimed in claim 1 wherein the duration of said rinsing phase is infinitely adjustable within its range.

5. Method as claimed in claim 1 wherein said rinsing phase is not less than 0.10 second in duration.

6. Method as claimed in claim 5 wherein said rinsing phase does not exceed 0.50 sec in duration.

7. Method as claimed in claim 5 wherein said rinsing phase is not less than 0.20 sec nor more than 0.30 sec in duration.

8. Method as claimed in claim 1 wherein the duration and flow intensity of said rinsing phase are controlled independently of said shock phase.

9. Method as claimed in claim 1 wherein the duration and hence the mean air flow intensity of said rinsing phase are controlled independently of said shock phase.

10. Method as claimed in claim 1 wherein the peak gas flow intensity during said shock phase and the mean gas flow intensity during said rinsing phase are adjustable each independently of the other.

11. Method as claimed in claim 1 wherein the volume of compressed gas effective for cleaning a said filter element corresponds approximately to the volume of said filter element, and said cleaning gas is kept ready under pressure in the close vicinity of said free aperture of said filter element, the pressure of said cleaning gas when so kept ready being between 3000 millimeters and 8000 mm water column, said cleaning gas being directed into said filter element directly through said free aperture by way of a large-area valve having a driving nozzle, and the combined duration of said shock phase and said rinsing phase being such that said valve becomes closed at a pressure of said cleaning gas of not less than 2000 mm water column.

12. Method as claimed in claim 11 wherein the pressure of said cleaning gas when so kept ready is between 4000 mm and 6000 mm water column.

13. Method as claimed in claim 1 wherein the pressure within said filter element that jerks said fabric from said filtering position to said modified position is between 100 mm and 600 mm water column consequent on such sudden application of reverse gas flow of high intensity.

14. The method as claimed in claim 1 wherein two or more of the respective bag elements are cleaned simultaneously.

* * * * *

UNITED STATES PATENT AND TRADEMARK OFFICE
CERTIFICATE OF CORRECTION

PATENT NO. : 4,247,310
DATED : January 27, 1981
INVENTOR(S) : WILLIBALD BORST

It is certified that error appears in the above—identified patent and that said Letters Patent is hereby corrected as shown below:

Please correct the inventors name and the Foreign Application Priority Data to read as follows:

[75]--Inventor

Willibald Borst, Uzwill, Switzerland  --rather than--

[75]--Inventor

Williband Borst, Uzwill, Switzerland as it now appears,

[30]--Foreign Application Priority Data

Dec. 28, 1977 [CH]  Switzerland........008786/77  --rather than--

[30]--Foreign Application Priority Data

Dec. 28, 1977 [CH]  Switzerland........008186/77 as it now appears.

Signed and Sealed this

Twenty-eighth Day of April 1981

[SEAL]

Attest:

RENE D. TEGTMEYER

Attesting Officer      Acting Commissioner of Patents and Trademarks